US009581369B2

(12) United States Patent
Vreeland et al.

(10) Patent No.: US 9,581,369 B2
(45) Date of Patent: Feb. 28, 2017

(54) EVAPORATOR WITH PHASE CHANGE MATERIAL

(71) Applicant: MAHLE International GmbH, Stuttgart (DE)

(72) Inventors: Gary S. Vreeland, Medina, NY (US); Scott B. Lipa, Snyder, NY (US)

(73) Assignee: MAHLE International GmbH, Stuttgart (DE)

( * ) Notice: Subject to any disclaimer, the term of this patent is extended or adjusted under 35 U.S.C. 154(b) by 225 days.

(21) Appl. No.: 14/565,687

(22) Filed: Dec. 10, 2014

(65) Prior Publication Data

US 2015/0107295 A1   Apr. 23, 2015

Related U.S. Application Data

(63) Continuation-in-part of application No. 14/019,775, filed on Sep. 6, 2013.

(51) Int. Cl.
| | |
|---|---|
| *F25B 39/02* | (2006.01) |
| *B60H 1/00* | (2006.01) |
| *F28F 21/08* | (2006.01) |
| *F28D 1/03* | (2006.01) |
| *F28D 9/00* | (2006.01) |
| *F28D 20/02* | (2006.01) |
| *F28D 21/00* | (2006.01) |
| *F28D 20/00* | (2006.01) |

(52) U.S. Cl.
CPC ............. *F25B 39/02* (2013.01); *B60H 1/005* (2013.01); *F25B 39/022* (2013.01); *F28D 1/0341* (2013.01); *F28D 9/005* (2013.01); *F28D 20/02* (2013.01); *F28F 21/08* (2013.01); *F25B 2400/24* (2013.01); *F28D 2020/0013* (2013.01); *F28D 2021/0085* (2013.01); *Y02E 60/145* (2013.01)

(58) Field of Classification Search
CPC ......... F25B 39/02; F25B 39/022; F25B 16/00
USPC ........................................... 62/515, 524, 519
See application file for complete search history.

(56) References Cited

U.S. PATENT DOCUMENTS

| | | | |
|---|---|---|---|
| 2002/0088246 A1* | 7/2002 | Bureau .............. | B60H 1/00321 62/434 |
| 2002/0088248 A1* | 7/2002 | Bureau .............. | B60H 1/00321 62/515 |
| 2003/0131623 A1* | 7/2003 | Suppes ................. | C09K 5/063 62/324.1 |

(Continued)

*Primary Examiner* — Melvin Jones

(74) *Attorney, Agent, or Firm* — Brinks Gilson & Lione

(57) ABSTRACT

An evaporator configured to transfer heat between air flowing through the evaporator and refrigerant within the evaporator, and transfer heat between the refrigerant within the evaporator and phase change material (PCM) within the evaporator. The evaporator includes a first plate, a second plate, and a first tube. The second plate is coupled to the first plate to form an assembly that defines a cavity to contain PCM. The assembly also defines a first opening that cooperates with corresponding first openings in other assemblies to define a first manifold to convey refrigerant. The first manifold is defined when the assembly is arranged with the other assemblies to form a stack. The first tube is in fluidic communication with the first manifold. The assembly cooperates with an adjacent assembly of the other assemblies when the stack is formed to define a first slot configured to receive the first tube.

9 Claims, 7 Drawing Sheets

(56) References Cited

U.S. PATENT DOCUMENTS

2007/0029075 A1* 2/2007 Mehendale .......... F28D 1/0333
  165/153
2012/0042687 A1 2/2012 Kamoshida et al.

* cited by examiner

EVAPORATOR WITH PHASE CHANGE MATERIAL

CROSS REFERENCE TO RELATED APPLICATION

This application claims the benefit of U.S. Provisional Patent Application No. 61/702,889 for an EVAPORATOR PHASE CHANGE THERMAL SIPHON, filed on Sep. 19, 2012. This application is a continuation-in-part of U.S. patent application Ser. No. 14/019,775 filed on 6 Sep. 2013, which is a continuation-in-part of U.S. patent application Ser. No. 13/451,665, filed on 20 Apr. 2012, which is a continuation-in-part of U.S. patent application Ser. No. 12/481,933, filed on 10 Jun. 2009. The disclosures of U.S. Provisional Patent Application No. 61/702,889, U.S. patent application Ser. No. 14/019,775, U.S. patent application Ser. No. 13/451,665, and U.S. patent application Ser. No. 12/481,933 are incorporated herein by reference.

TECHNICAL FIELD OF INVENTION

The disclosure relates to an air conditioning system for cooling the passenger compartment of an automobile; more particularly, to an evaporator of the air conditioning system; and still more particularly, to an evaporator equipped with phase change material.

BACKGROUND OF THE INVENTION

Fuel efficiency in an automobile may be enhanced by shutting off the gasoline engine during brief periods of time when power from the engine is not required for propulsion, such as when the automobile is coasting or temporarily stopped at an intersection. However, the compressor of a traditional air conditioning system runs off the crankshaft of the gasoline engine, and therefore, the engine continues to operate during those inefficient periods to provide cooling comfort for the passengers of the automobile.

U.S. Pat. No. 7,156,156, issued to Haller et al. on Jan. 2, 2007 (hereinafter referred to as Haller '156), provides one solution to the problem of the air conditioning system not functioning when the engine is not running. The Haller '156 patent shows an evaporator having a refrigerant flowing there-through for transferring heat from a flow of air to the refrigerant in a first operating mode with the engine of the automobile running. The evaporator includes a manifold extending in a horizontal direction. At least one tube is in fluid communication with manifold and extends downward in a vertical direction away from the manifold.

The evaporator defines at least one cavity, or tank, for storing a phase change material (PCM) to transfer heat from the PCM to the refrigerant to cool and freeze the PCM in the first operating mode with the engine of the automobile running. The cavities of the Haller '156 patent are disposed adjacent to and engaging the plurality of tubes. In a second operating mode with the engine of the automobile dormant, heat is transferred directly from the flow of air to the PCM in the cavities to cool the flow of air and to melt or warm the PCM.

There remains a continuing need for improved evaporators having a PCM to increase the efficiency of air conditioning systems that continue to operate during brief periods of time when the engine of the automobile is shut off to increase the fuel efficiency of the automobile.

SUMMARY OF THE INVENTION

In accordance with one embodiment, an evaporator for an air conditioning system is provided. The evaporator is configured to transfer heat between air flowing through the evaporator and refrigerant within the evaporator, and transfer heat between the refrigerant within the evaporator and phase change material (PCM) within the evaporator. The evaporator includes a first plate, a second plate, and a first tube. The second plate is coupled to the first plate to form an assembly that defines a cavity to contain PCM. The assembly also defines a first opening that cooperates with corresponding first openings in other assemblies to define a first manifold to convey refrigerant. The first manifold is defined when the assembly is arranged with the other assemblies to form a stack. The first tube is in fluidic communication with the first manifold. The assembly cooperates with an adjacent assembly of the other assemblies when the stack is formed to define a first slot configured to receive the first tube.

In another embodiment, the evaporator includes a second tube. The assembly is further configured to define a second opening that cooperates with corresponding second openings in the other assemblies to define an second manifold to convey refrigerant. The second manifold is defined when the stack is formed. The second tube is in fluidic communication with the second manifold. The assembly and the adjacent assembly further cooperate to define a second slot configured to receive the second tube.

Other advantages of the present invention will be readily appreciated as the same becomes better understood by reference to the following detailed description when considered in connection with the accompanying drawings.

BRIEF DESCRIPTION OF THE DRAWINGS

This invention will be further described with reference to the accompanying drawings in which.

DETAILED DESCRIPTION OF THE INVENTION

Shown in the FIGS. 1-4, wherein like numerals indicate corresponding parts throughout the views, is a plate type heat exchanger, hereafter the evaporator 100, having louvered clam shell housings 200 containing a phase change material (PCM) 250. The louvered clam shell housings 200 enables a more efficient evaporator that contains less mass and parts resulting in ease of manufacturability. The added advantages of the louvered clam shell housings 200 will be readily appreciated, as the same becomes better understood by reference to the following detailed description when considered in connection with the accompanying drawings.

A typical air conditioning system for an automobile includes a compressor driven by the automobile's engine. The compressor cycles a two-phase refrigerant through an evaporator, in which the refrigerant expands into a vapor phase while extracting heat energy from a stream of ambient air flowing through the evaporator core, which is defined by the evaporator's refrigerant tubes and interconnecting fins, thereby cooling the air stream. The stream of cooled air may be routed to the automobile cabin to provide comfort cooling for the passengers.

For conservation of fuel, the engine of the automobile may be turned off at predetermined conditions, such as when the automobile is coasting down gradient or temporarily stopped at an intersection. During the period of time when the engine is turned off, the engine is not driving the compressor that cycles the refrigerant through the evaporator. The air conditioning system of such an automobile may be provided with an evaporator having a phase change material to extend the period of cooling to the passenger compartment when the engine is turned off and not driving the compressor.

Figure 1:
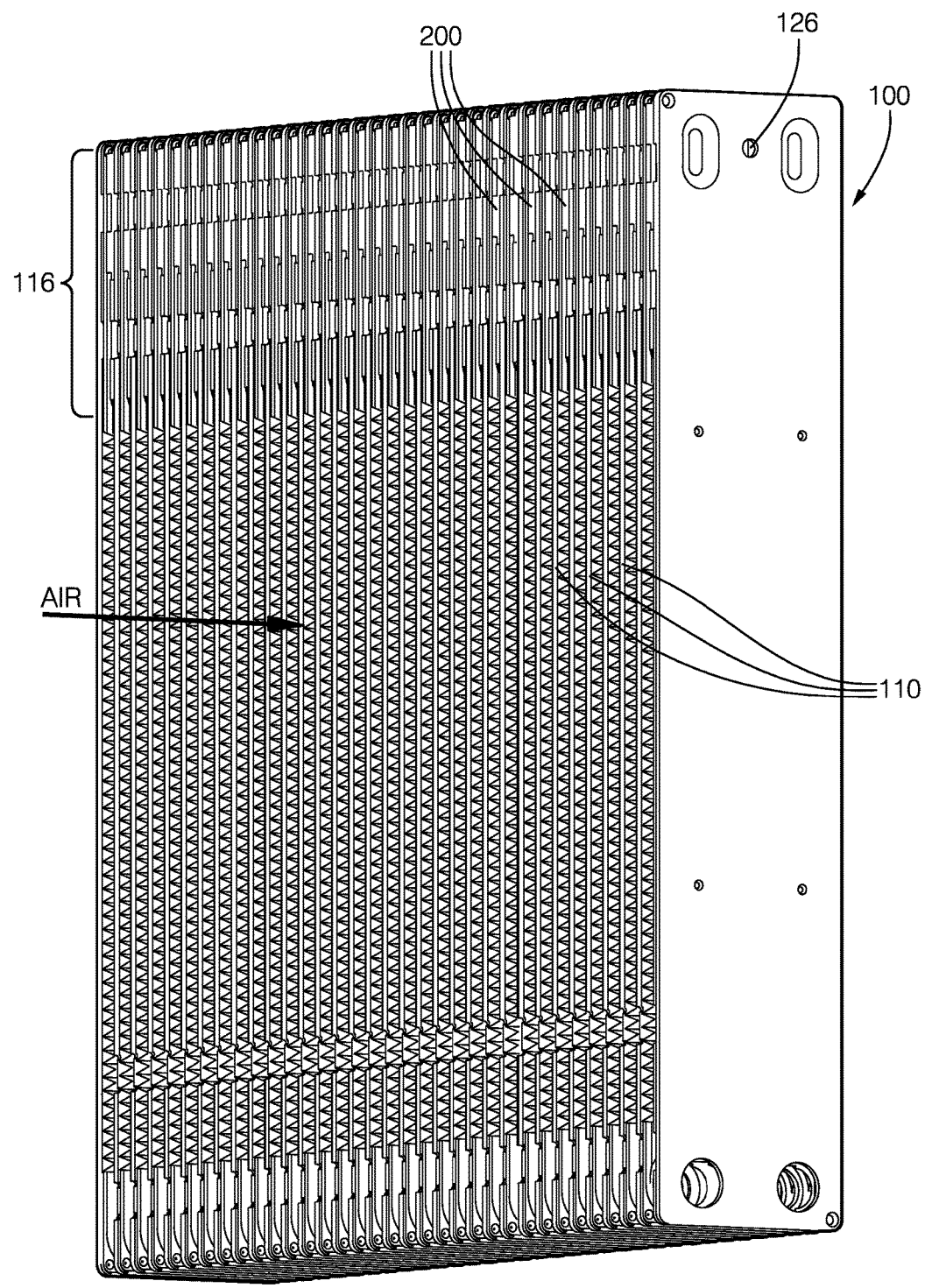
FIG. 1 is a perspective view of an exemplary embodiment of an evaporator with a phase change material contained within louvered clam shell housings positioned between adjacent refrigerant tubes.
Figure 2:
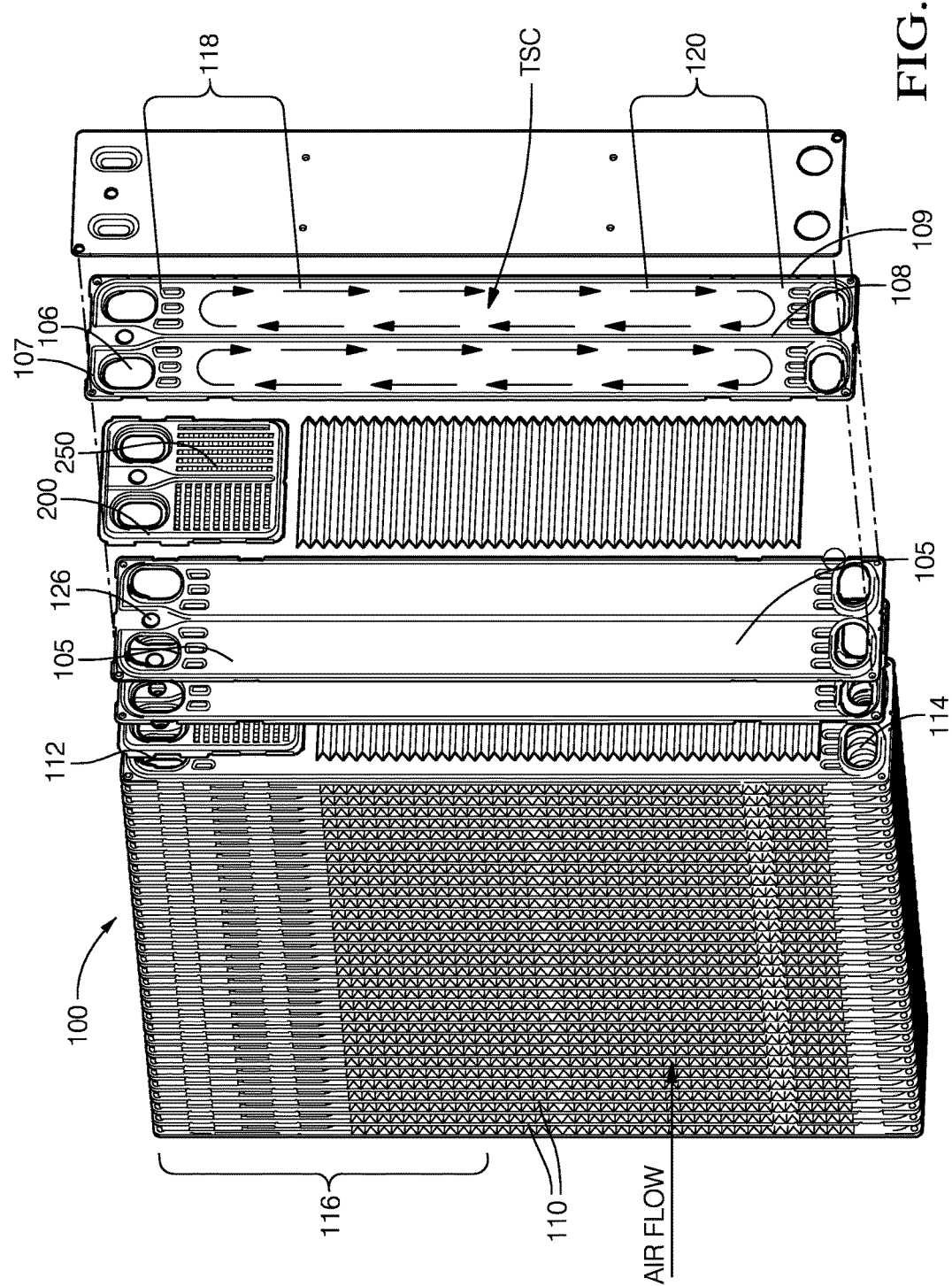
FIG. 2 is a perspective partially exploded view of the evaporator of FIG. 1.

Shown in FIGS. 1 and 2 is an exemplary embodiment of the evaporator 100 having a plurality of louvered clam shell housings 200. The louvered clam shell housings 200 contain a material (PCM) 250 that is in thermal communication with the top region 116 of the evaporator 100. The evaporator 100 may be manufactured from a plurality of stamped metallic plates 105. Each of the stamped metallic plates 105 define features known to those of ordinary skill in the art, such as manifold openings 106, bosses 107 about the manifold openings 106, internal ribs 108, and flanges 109. The plurality of stamped metallic plates 105 are assembled into the evaporator 100 by stacking the stamped metallic plates 105 and then brazing the various parts together. The manifold openings 106, bosses 107, internal ribs 108, and flanges 109 of each metallic plate cooperates with the corresponding manifold openings 106, bosses 107, internal ribs 108, and flanges 109 of the adjacent instances of the stamped metallic plates 105 to define a pair of upper manifolds 112, a pair of lower manifolds 114, and a plurality of refrigerant tubes 110 hydraulically connecting the upper manifolds 112 and the lower manifolds 114. The terms upper and lower are used with respect to the direction of gravity.

A plurality of louvered clam shell housings 200 are disposed between the refrigerant tubes 110 near the top region 116 of the evaporator 100 adjacent the pair of upper manifolds 112. The louvered clam shell housings 200 may surround a portion of the pair of upper manifolds 112 or, as an alternative, may be positioned in the upper portion 118 of the refrigerant tubes 110 immediately below the upper manifolds 112. A PCM 250, such as a liquid saturated hydrocarbon having a molecular formula of $C_nH_{2n+2}$, a paraffin wax, or any other material that may remain in a liquid phase at room temperature, is disposed in each of the louvered clam shell housings 200. A heat conductive material such metallic particles or fibers may be added into the PCM 250 contained in the louvered clam shell housings 200 to increase the heat transfer efficiency.

Best shown in FIG. 2, when the air conditioning system is in the second operating mode, engine is turned off and the compressor is not cycling refrigerant through the evaporator 100, heat energy is transferred from the higher temperature vapor refrigerant within the refrigerant tubes 110 to the lower temperature PCM 250 contained in the louvered clam shell housings 200, thereby cooling and condensing the refrigerant into a liquid phase. As the higher density condensed liquid phase refrigerant drops downward toward the lower portion 120 of the refrigerant tubes 110 due to gravity, the refrigerant absorbs heat from the flow of ambient air stream and expands back into a vapor phase. The lower density vapor refrigerant floats upwardly toward the lower temperature PCM 250 where the vapor refrigerant is subsequently re-cooled and re-condensed to repeat the cycle. This cycling of the refrigerant within the refrigerant tube is referred to as a thermal siphon cycle as shown in FIG. 2 and referenced as TSC. By positioning the PCM 250 to be in thermal contact with only the upper portion 118 of the refrigerant tubes 110, the lower temperature PCM 250 induces a steady thermal siphon within the refrigerant tubes 110 that allows the refrigerant to continue to cool the on-coming air stream while the compressor is not operating for brief periods of time. The thermal siphon cycle continues until either the engine is powered on driving the compressor or the cooling capacity of the PCM 250 is depleted.

Figure 3:
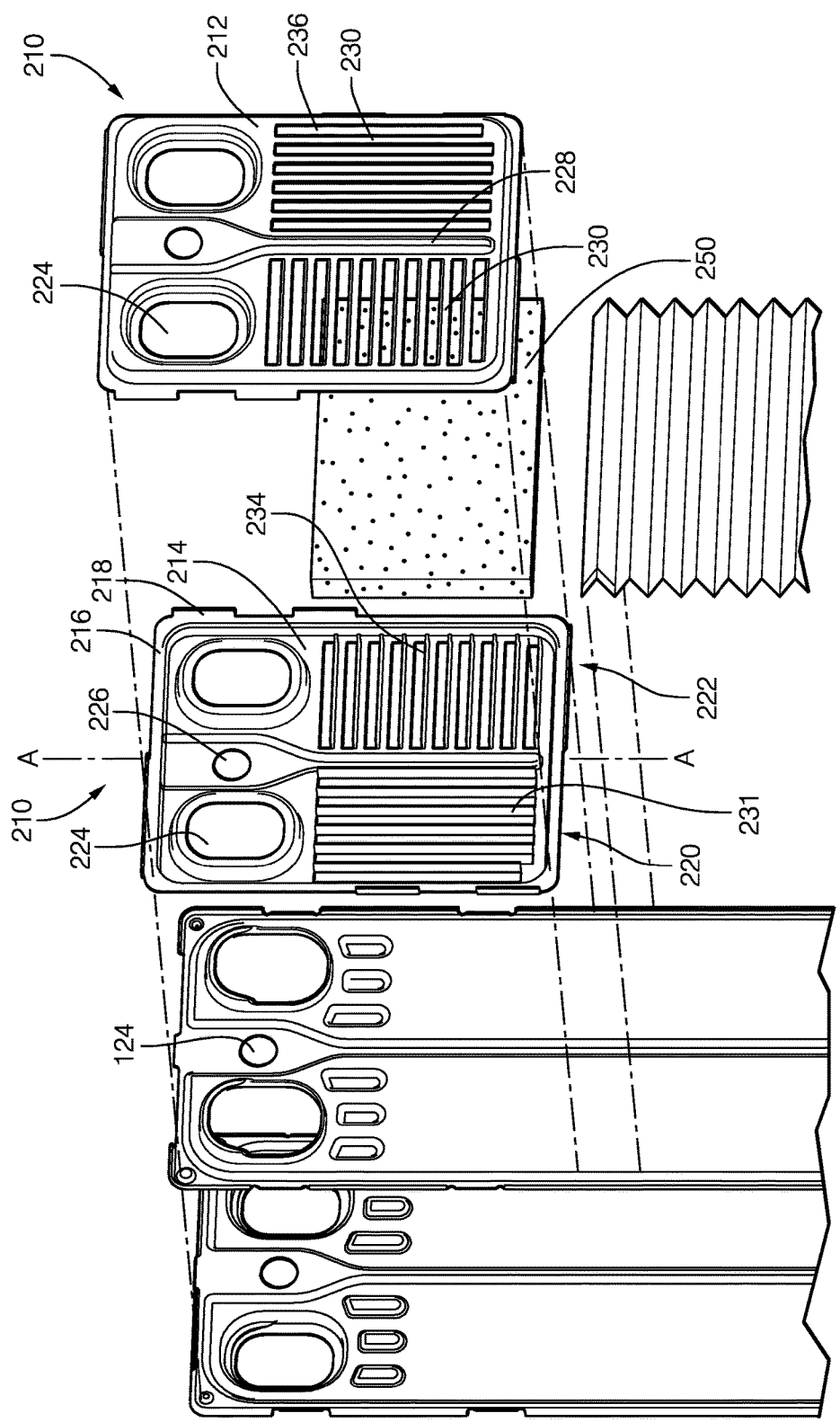
FIG. 3 is perspective exploded detailed view of the louvered clam shell housing containing a phase change material.

Referring to FIG. 3, each of the clam shell plates 210 includes complementary features that allow one of the clam shell plates 210 to be rotated 180 degrees about a central axis A and assembled onto another one of the clam shell plates 210 to form the louvered clam shell housings 200. The clam shell plates 210 may be stamped or otherwise formed from a sheet of heat conductive material, such as aluminum, to define louvers 230, a port 226, and manifold openings 224.

The upper portion 118 of the refrigerant tubes 110 may include through-holes 124 that extend from one surface of the refrigerant tube to the opposite surface of the refrigerant tube. The louvered clam shell housings 200 may include a port 226 that cooperate with the through-holes 124 in the refrigerant tubes 110 to define a passageway 126 through the evaporator 100 for hydraulic communication of the PCM 250 between the louvered clam shell housings 200. The passageway 126 allows for the ease of filling the louvered clam shell housings 200 with the PCM 250 during manufacturing and also allows for the PCM 250 to migrate from one of louvered clam shell housings 200 to another to account for unequal expansion and/or contraction of the PCM 250 in the louvered clam shell housings 200 due to thermal gradient across the evaporator 100.

Maintaining the PCM 250 immediately below the pair of upper manifolds 112 allows greater thermal conductivity between the PCM 250 and the refrigerant in the refrigerant tube. The length of the louvered clam shell housings 200 extending along the refrigerant tube may be adjusted to provide the desired volume of PCM 250 required to achieve the desire cooling performance while the air conditioning system is operating in the second mode, during which the compressor is not cycling refrigerant through the evaporator 100.

It is preferable to fill less than the full capacity of the louvered clam shell housings 200 with the PCM 250 to account for the volumetric expansion of the material at elevated temperatures up to 200° F. The position of the port 226 is positioned with respect to the louvered clam shell housings 200 to allow the PCM 250 to migrate between the louvered clam shell housings 200. If the port 226 is too high, the PCM 250 cannot redistribute and equalization of the louvered clam shell housings 200 volume between spaces will not occur. A uniform distribution of PCM 250 will minimize cost and ensure optimum operation. If a louvered clam shell housings 200 has an excess of the PCM 250, it will result in additional cost. With too little of the PCM 250, it will result in poor performance in that portion of the evaporator 100.

Figure 4:
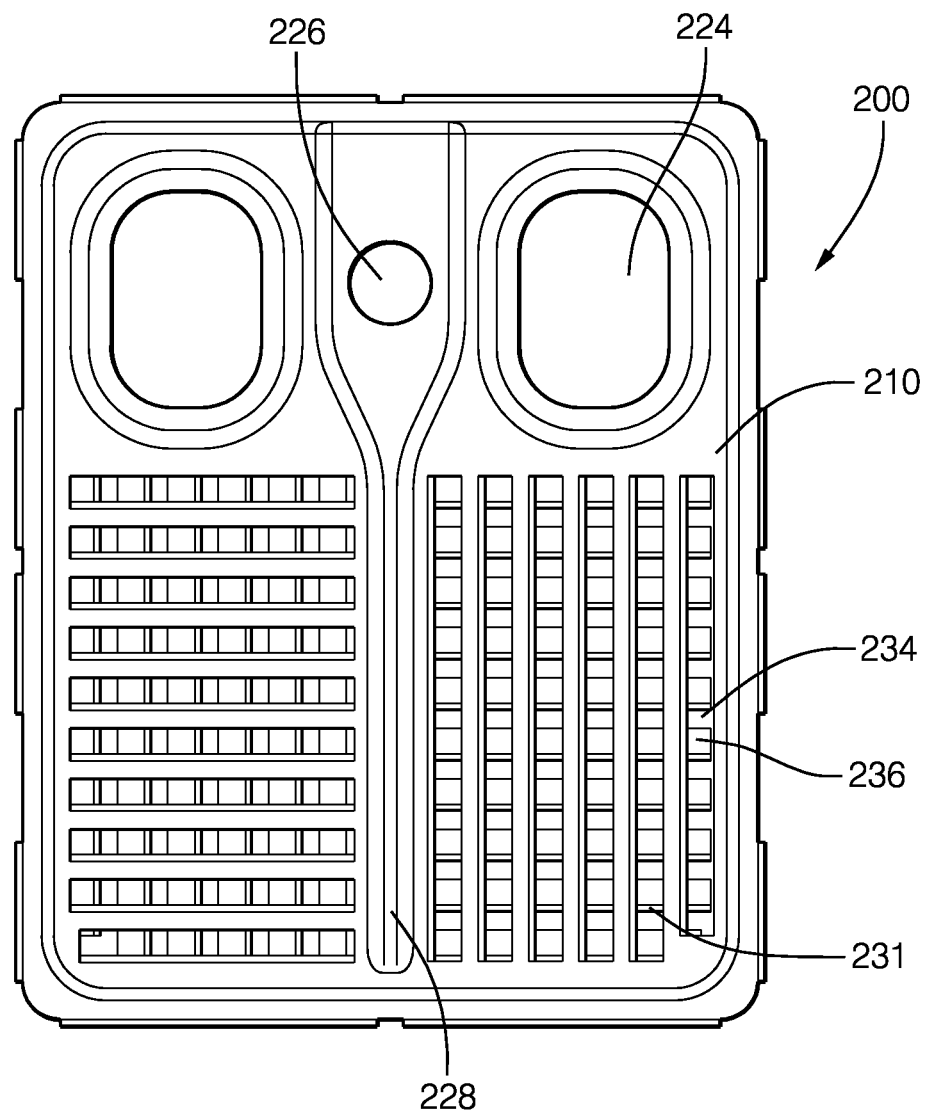
FIG. 4 shows an assembled clam shell housing of FIG. 3.

Referring to FIGS. 3 and 4, each of louvered clam shell housings 200 is assembled from two substantially identically formed instances of the clam shell plates 210. Each of the clam shell plates 210 includes an exterior surface 212, an interior surface 214 opposite that of the exterior surface 212, a rim 216 extending perpendicular from the perimeter of the interior surface 214, a plurality of tabs 218 extending from the rim 216, and a central rib 228 extending through a center axis (A). Each of the clam shell plates 210 further defines a pair of manifold openings 224 and a port 226.

A plurality of louvers 230 is formed in a first portion 220 and second portion 222 located on either side of the central axis (A) below the manifold openings 224 of the clam shell plate 210. The louvers 230 may be formed by folding a plurality of slats 231 defined between pairs of slits at approximately a right angle relative to the interior surface 214. To increase the number of louvers 230, long narrow bumps may be formed and subsequently slit to define the slats 231 to have a rectangular shape with a length (L). A set of louvers 230 may extend in a first direction on one side of the central axis A and another set of louvers 230 may extend in a second direction on the other side of the central axis A. The first direction may be at a right angle to the central axis A and the second direction may be parallel to the central axis A.

Two of the clam shell plates 210 are assembled in a louvered clam shell housings 200 by first rotating one of the clam shell plates 210 one-hundred eighty degrees (180°) about the central axis (A) such that the interior surface 214 of one of the clam shell plates 210 is oriented toward the other. Two of the clam shell plates 210 are then brought together such that the rim 216 of each clam shell plates 210 are engaged to one another. The tabs 218 of one of the clam shell plates 210 cooperates with the tabs 218 of another of the clam shell plates 210 to lock two of the clam shell plates 210 together to provide the louvered clam shell housings 200 defining an interior chamber 232 to contain the PCM 250.

Shown in FIG. 4, the slats 231 are bumped, slit, and folded such that the distal edges 234 of the louvers 230 of one of the clam shell plates 210 may engage the distal edges 234 of the louvers 230 of another of the clam shell plates 210 at a 90 degree angle once two of the clam shell plates 210 are joined. The crossing engagement of the distal edges 234 of the louvers 230 provides structural integrity to the louvered clam shell housings 200 and in turn, increases the overall structural integrity of the evaporator 100 once the louvered clam shell housings 200 are assembled and brazed into position between the refrigerant tubes 110. The louver openings 236 are defined in the clam shell plates 210 by the slitting and folding of the louvers 230 enables the PCM 250 to directly physically contact the exterior surfaces of the refrigerant tubes 110, thereby increasing thermal conductivity between the PCM 250 and refrigerant within the refrigerant tubes 110.

Figure 5:
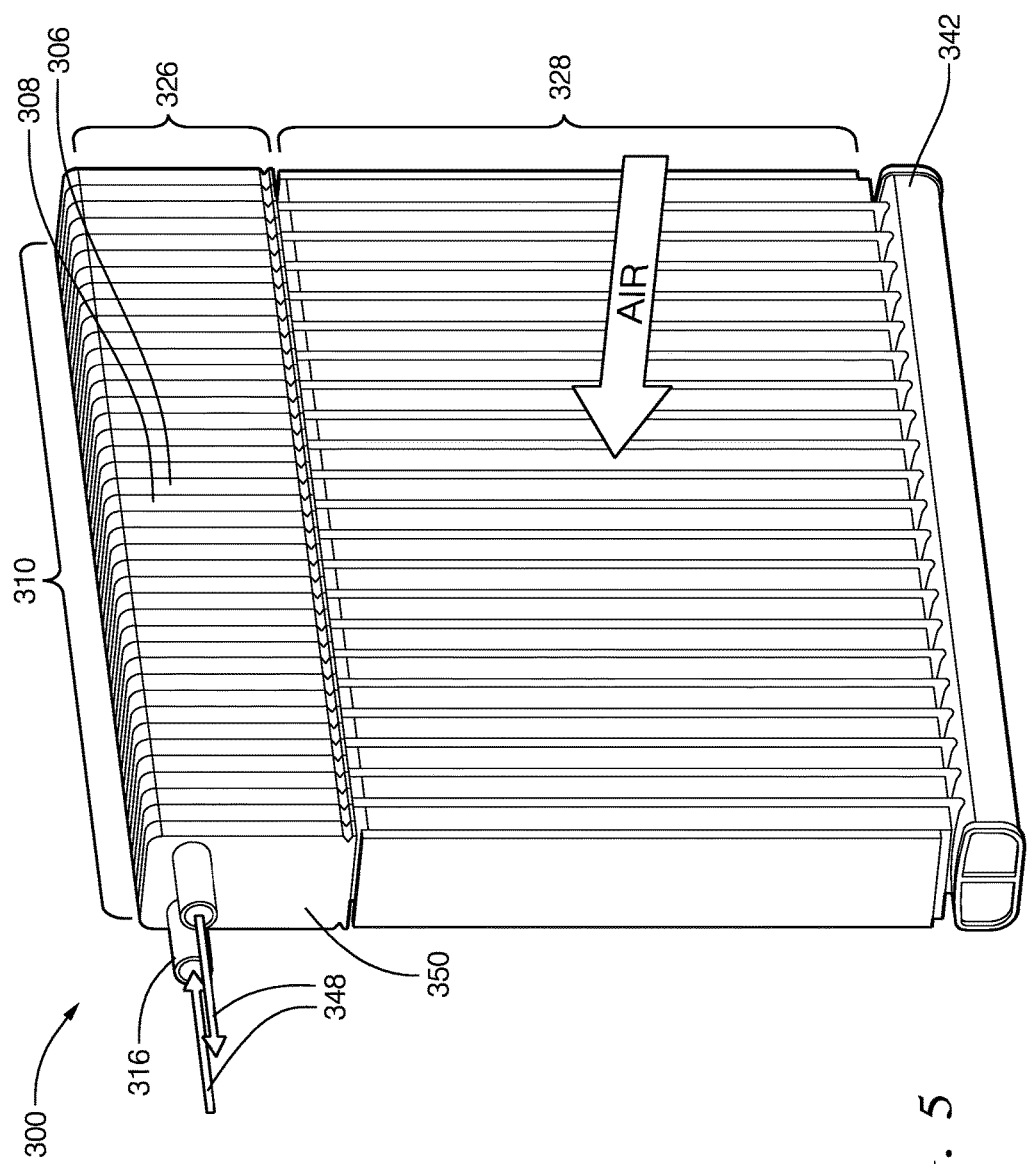
FIG. 5 is an alternative embodiment of an evaporator with a phase change material.
Figure 6:
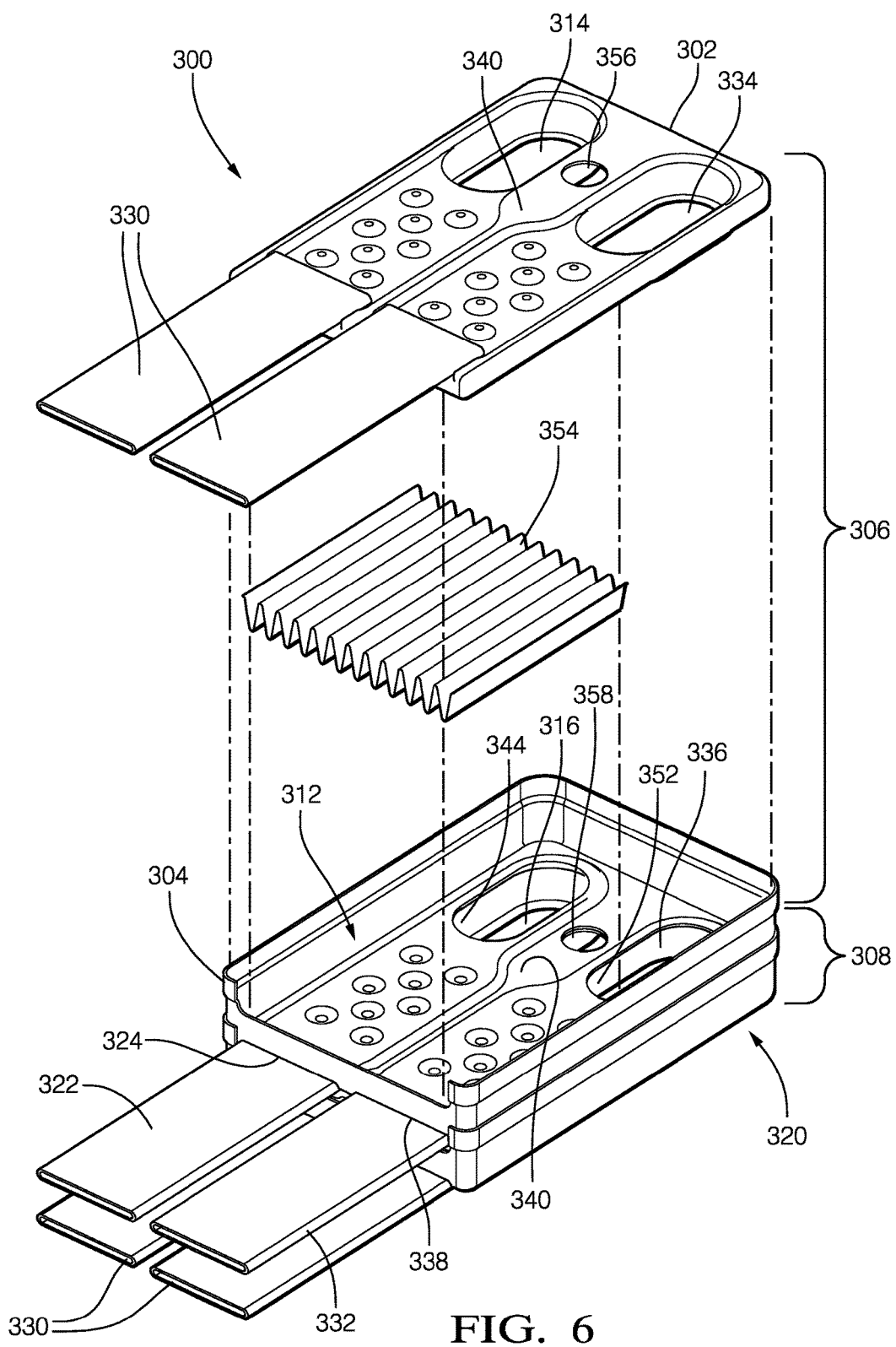
FIG. 6 is a partially exploded isometric view of some parts used in the evaporator of FIG. 5.
Figure 7:
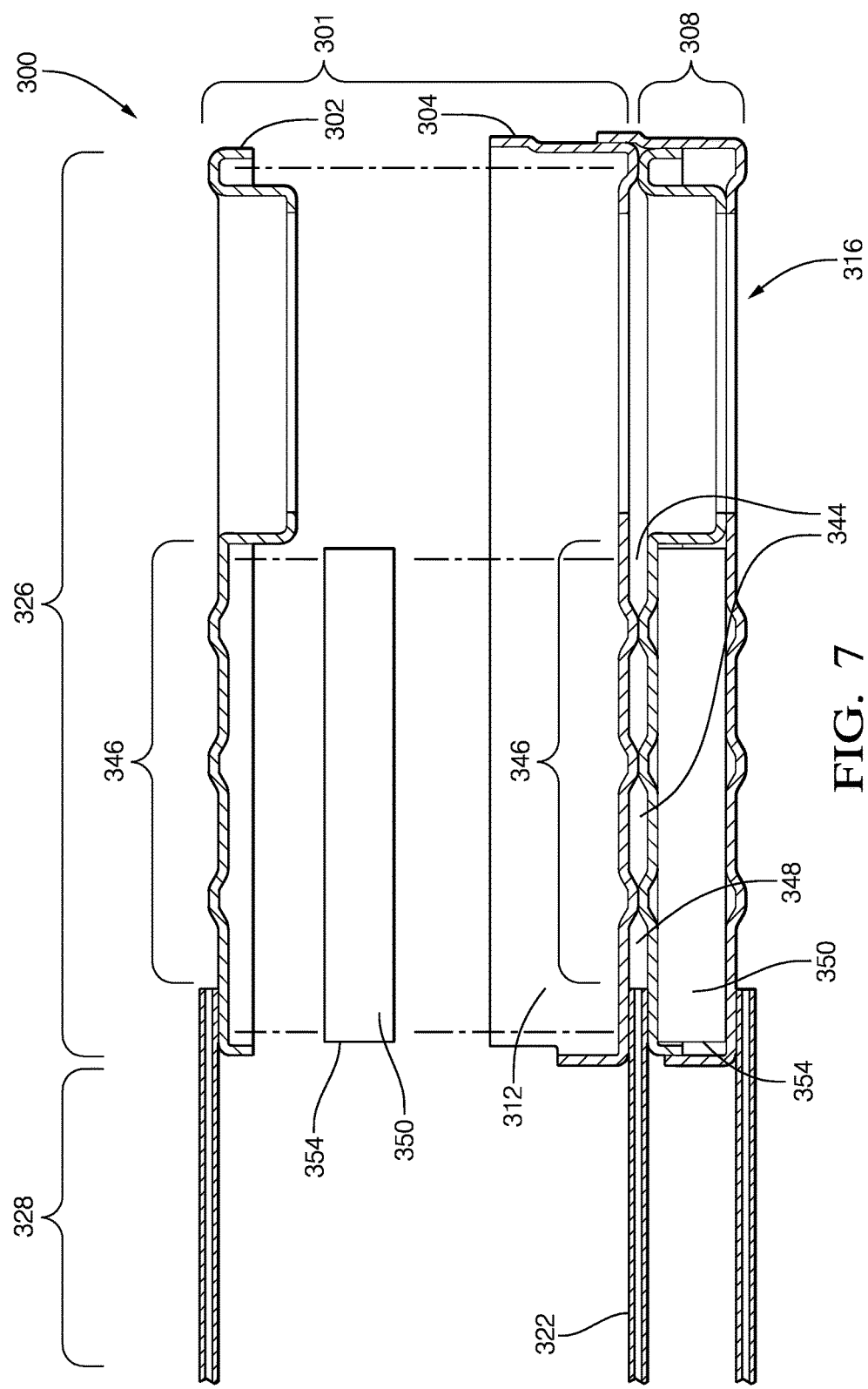
FIG. 7 is a cross sectional perspective view of FIG. 6.

FIGS. 5-7 illustrate a non-limiting example of an alternative embodiment of an evaporator 300 for an air conditioning system (not shown). The evaporator 300 is configured to transfer heat between air flowing through the evaporator and refrigerant within the evaporator, and transfer heat between the refrigerant within the evaporator and phase change material (PCM) within the evaporator. As explained above, the PCM is present to help maintain the temperature of the evaporator 300 when the system is not circulating the refrigerant and thereby enable conditioned air to be provided from the evaporator when the compressor is not operating.

FIG. 6 illustrates some non-limiting details of the evaporator 300. The evaporator 300 includes a first plate 302 and a second plate 304. When the first plate 302 and the second plate 304 are coupled together by brazing, for example, an assembly 306 is formed that may include other optional parts described below. The assembly 306 defines a cavity 312 to contain the PCM, see FIG. 3 reference number 250 for an example. The first plate 302 and the second plate 304 cooperate so the assembly 306 can also define a first opening 314 that cooperates with corresponding first openings in other assemblies 310, and other plumbing known to those in the art to define a first manifold 316 to convey refrigerant to or from refrigerant tubes that make up the core of the evaporator 300. That is, the first manifold 316 is defined when the assembly 306 is arranged with an adjacent assembly 308 which is one of the other assemblies 310, and the other assemblies 310 to form a stack 320. It should be appreciated that the assembly 306 is shown as parts spaced apart for the purpose of explanation, and that when the first plate 302 and the second plate 304 are coupled, the assembly 306 will appear similar to the adjacent assembly 308.

The evaporator 300 also includes a first tube 322 in fluidic communication with the first manifold 316. The assembly 306, in particular the second plate 304 of the assembly 306, cooperates with the adjacent assembly 308 of the other assemblies 310 when the stack 320 is formed to define a first slot 324 configured to receive the first tube 322. That is, the assembly 306 and the adjacent assembly 308 include or define relief areas that define the first slot 324 when the assembly 306 and the adjacent assembly 308 are joined together as part of the process of forming the stack 320 by, for example, brazing. As will be recognized by those in the art, the assembly 306 and the other assemblies 310 cooperate to form a header portion 326 of the evaporator 300, and the first tube 322 and a plurality of other tubes 330 cooperate to form a body portion 328 of the evaporator 300.

As will be explained in more detail below, the evaporator 300 illustrated is sometimes referred to as a two-row evaporator. As such, the evaporator 300 may include a second tube 332, however this is not required. It is contemplated that the teachings presented herein can be applied to a single-row type evaporator that has only a single layer of tubes as opposed to the two rows of tubes illustrated herein where the first tube 322 was one of a first layer of tubes, and the second tube 332 was one of a second layer of tubes. It is also contemplated that the teachings presented herein can be applied to multiple-row (e.g. four-row) type evaporators with more than two rows. However, since multiple-row evaporators are presently popular, the non-limiting example presented in the drawings is other than a single-row evaporator.

Accordingly, the assembly 306 may be further configured to define a second opening 334 that cooperates with corresponding second openings in the other assemblies 310 to define a second manifold 336 to convey refrigerant to or from the second tube 332. Like the first manifold 316, the second manifold 336 is defined when the stack 320 is formed by arranging or stacking an alternating arrangement of parts corresponding to the first plate 302 and the second plate 304. It follows that the second tube 332 is in fluidic communication with the second manifold 336, so the assembly 306 and the adjacent assembly 308 further cooperate to define a second slot 338 configured to receive the second tube 332. In order to keep refrigerant of the first tube 322 segregated from refrigerant of the second tube 332, the plates (e.g. the first plate 302 and the second plate 304) may include a partition feature 340 on either or both of the plates.

If the evaporator 300 is a two-row type evaporator, the evaporator 300 may be configured so the first tube 322 conveys refrigerant away from the first manifold 316, and the second tube 332 conveys refrigerant toward the second manifold 336. Accordingly, the evaporator 300 may include a return manifold 342 (FIG. 5) that receives refrigerant from the first tube 322 and routes that refrigerant back into the second tube 332. Alternatively, the return manifold 342 may be configured to receive refrigerant from both the first tube 322 and the second tube 332 for routing to other parts of the air conditioning system.

FIG. 7 further illustrates some non-limiting details of the evaporator 300. In order to maximize heat transfer between refrigerant and PCM in the header portion 326, the first plate 302 and the second plate 304 may be advantageously configured to space apart the end of the first tube 322 and the first manifold 316. That is, the assembly 306 and the adjacent assembly 308 may further cooperate to define a first passage 344 to fluidicly couple the first tube 322 to the first manifold 316, and thermally couple the refrigerant in the first passage 344 to PCM in the cavity 312. Because first passage 344 allows for the end of the first tube 322 to be spaced apart from the first manifold 316, the thermal coupling between the refrigerant in the first passage 344 and the PCM in the cavity 312 is via a single layer of that in this instance part of the second plate 304. This arrangement stands in contrast to evaporator configurations where the ends of the tubes are close to the manifolds such that the thermal coupling between refrigerant and PCM is through the wall of the tube and a wall section of whatever is containing the PCM, i.e. two layers of metal. That is, in this example, the first plate 302 and the second plate 304 each define a wall section 346 that is in direct contact with PCM 350 on one side of the wall section 346 and in direct contact with refrigerant 348 on the other side of the wall section 346.

As noted previously, the teachings presented herein are applicable to single-row and multiple-row evaporators. As such, it follows that for the non-limiting example presented in the drawings, the assembly 306 and the adjacent assembly 308 may further cooperate to define both the first passage 344 to fluidicly couple the first tube 322 to the first manifold 316 and thermally couple refrigerant in the first passage 344 to PCM in the cavity 312, and a second passage 352 (FIG. 6) to fluidicly couple the second tube 332 to the second manifold 336 and thermally couple refrigerant in the second passage 352 to PCM 350 in the cavity 312.

In order to further improve thermal coupling of the PCM 350 to the refrigerant 348 in either the first passage 344 or the second passage 352, the cavity 312 may be equipped with a fin 354 or other suitable thermal conducting device to better couple heat into and out of the PCM 350.

The first plate 302 and the second plate 304 may also be configured so each defines a fill opening 356 that cooperates with corresponding fill openings in the other assemblies 310 to define a fill manifold 358 for hydraulic or fluidic communication of PCM between the cavities (e.g. the cavity 312 and corresponding cavities of the other assemblies 310) of each of the assemblies (e.g. the assembly 306 and the other assemblies 310) when the stack 320 is formed. Providing the fill manifold 358 is advantageous for the ease of filling the cavities with the PCM 350 during manufacturing and allowing for the PCM 350 to migrate from one cavity to another to account for unequal expansion and/or contraction of the PCM 350 due to thermal gradient across the evaporator 300.

Accordingly, an evaporator 300 for an air conditioning system is provided. The evaporator 300 is configured to transfer heat between air flowing through the body portion 328 of the evaporator and refrigerant 348 within the evaporator, and also transfer heat between the refrigerant 348 within the evaporator and phase change material (the PCM 350) within the evaporator. As shown in FIG. 2, the presence of the PCM 350 can induce or establish a thermal siphon within the tubes if the refrigerant 348 is not being otherwise circulated by the air conditioning system. The cavities for the PCM necessary manifolds are created by an alternating series of parts similar to the first plate 302 and the second plate 304.

Prior attempts at evaporators with PCM provide PCM cartridges that are substituted for tubes within the body portion or core matrix of the evaporator. However these PCM cartridges undesirably restrict the flow of air through the body portion of the evaporator. The replacement of tubes by PCM cartridges also reduces the number of air fins in contact with the refrigerant tubes resulting in reduced airside heat transfer. The evaporator 300 described herein overcomes or solves this problem placing the PCM chambers (i.e. the cavity 312) at the top of the core as part of the header portion 326, and thereby out of the airflow region.

It has also been observed with prior attempts at evaporators with PCM that airside misdistribution will result in poorly utilized PCM. Regions of low airflow will not fully utilize the PCM whereas high airflow areas will utilize it quicker. This problem is solved by locating the PCM at the top of the evaporator so the PCM can always be utilized to condense the refrigerant regardless of the differences in airflow along the length of the tubes.

It has also been observed with prior attempts at evaporators that tube insertion in the upper manifold creates a volume between the end of the tube and the lower wall on manifold which prevents refrigerant from returning to the tubes and being available to create or maintain the thermal syphon. This problem is solved by eliminating tube insertion into the manifold. Any liquid in the manifold area can easily return to the lower portion of the core.

Additional benefits realized by the configuration of the evaporator 300 described herein include that thermal siphon condensing is improved. When condensation occurs within the small ports of the refrigerant tube, the liquid returning to the lower portion competes with the vapor moving upward towards the upper manifold. Elimination of the restrictive ports in condensing portion of the thermal siphon improves function.

Thermal conduction is improved due to the reduction in number of layers of material. Previous art has two thicknesses of material between the PCM and he refrigerant that is condensing. The evaporator 300 described herein has just one layer resulting less thermal resistance to heat transfer.

The tubes slots, formed from the two plates (e.g. the first plate 302 and the second plate 304) are more forgiving of variations in tube geometry than lanced slots. Forming the tube slots from two halves and then a manifold allows manufacturing to adjust parameters to accommodate varying tube geometry. For example, a bow in the profile of the tube can be accommodated with by less initial compression on the clam shell assembly (the manifold). After the tubes are inserted, additional force can be applied to achieve the desired dimensions. The plates can be assembled together, and then assembled into a sub-assembly to improve and facilitate manufacturing and reducing cost associated with dedicated operations to clinch the parts together. The individual plates and subsequent sub-assemblies may be held together by nesting as shown, or by a clinched tab or a snap feature. Holding the parts together can also be achieved within the equipment design without utilizing a future on the part.

It is also noted that the configuration of alternating plates could be used in the non-PCM end of the evaporator to form the return manifold 342. In such a configuration, the plates would not need the wall section 346 present in the header portion 326.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An evaporator for an air conditioning system, said evaporator configured to transfer heat between air flowing through the evaporator and refrigerant within the evaporator, and transfer heat between the refrigerant within the evaporator and phase change material (PCM) within the evaporator, said evaporator comprising:
a first plate; a second plate coupled to the first plate to form a first assembly that defines a cavity to contain PCM, wherein the first assembly also defines a first opening that cooperates with corresponding first openings in additional assemblies, each of said additional assemblies being formed of a further second plate coupled to a further first plate, to define a first manifold to convey refrigerant, wherein said first manifold is defined when the first assembly is arranged with the other plate assemblies to form a stack; and
a first tube in fluidic communication with the first manifold,
wherein the assembly cooperates with an adjacent assembly of the other assemblies when the stack is formed to define a first slot configured to receive the first tube.

2. The evaporator set forth in claim 1, wherein the first assembly and the adjacent assembly further cooperate to define a first passage to fluidicly couple the first tube to the first manifold, and thermally couple refrigerant in the first passage to PCM in the cavity.

3. The evaporator set forth in claim 1, wherein the first plate and the second plate each define a wall section that is in direct contact with PCM on one side of the wall section and in direct contact with refrigerant on the other side of the wall section.

4. The evaporator set forth in claim 1, wherein the first assembly and the other assemblies cooperate to form a header portion of the evaporator, and the first tube and a plurality of other tubes cooperate to form a body portion of the evaporator.

5. The evaporator set forth in claim 1, wherein the first plate and the second plate each define a fill opening that cooperates with corresponding fill openings in the other assemblies to define a fill manifold for hydraulic communication of PCM between the cavities of each of the assemblies when the stack is formed.

6. The evaporator set forth in claim 1, wherein the first assembly is further configured to define a second opening that cooperates with corresponding second openings in the other assemblies to define a second manifold to convey refrigerant, said second manifold defined when the stack is formed, wherein said assembly includes a second tube in fluidic communication with the second manifold, wherein the first assembly and the adjacent assembly further cooperate to define a second slot configured to receive the second tube.

7. The evaporator set forth in claim 6, wherein the evaporator is configured so the first tube conveys refrigerant away from the first manifold, and the second tube conveys refrigerant toward the second manifold.

8. The evaporator set forth in claim 6, wherein the first assembly and the adjacent assembly further cooperate to define a first passage to fluidicly couple the first tube to the first manifold and thermally couple refrigerant in the first passage to PCM in the cavity, and a second passage to fluidicly couple the second tube to the second manifold and thermally couple refrigerant in the second passage to PCM in the cavity.

9. The evaporator set forth in claim 6, wherein the first plate and the second plate each define a fill opening that cooperates with corresponding fill openings in the other assemblies to define a fill manifold for hydraulic communication of PCM between the cavities of each of the first and additional assemblies when the stack is formed.

* * * * *